US007933248B2

United States Patent
Hong et al.

(10) Patent No.: US 7,933,248 B2
(45) Date of Patent: Apr. 26, 2011

(54) METHOD AND APPARATUS FOR HANDOVER DECISION BY USING CONTEXT INFORMATION IN A MOBILE COMMUNICATIONS NETWORK

(75) Inventors: James Won-Ki Hong, Pohang-shi (KR); Joon-Myung Kang, Pohang-shi (KR)

(73) Assignee: Postech Academy-Industry Foundation, Kyungsangbuk-do (KR)

( * ) Notice: Subject to any disclaimer, the term of this patent is extended or adjusted under 35 U.S.C. 154(b) by 830 days.

(21) Appl. No.: 11/907,547

(22) Filed: Oct. 15, 2007

(65) Prior Publication Data

US 2008/0095120 A1  Apr. 24, 2008

(30) Foreign Application Priority Data

Oct. 18, 2006 (KR) .................. 10-2006-0101249

(51) Int. Cl.
*H04W 4/00* (2009.01)
(52) U.S. Cl. ....................... 370/332; 370/338
(58) Field of Classification Search ............. None
See application file for complete search history.

(56) References Cited

U.S. PATENT DOCUMENTS

| | | | | |
|---|---|---|---|---|
| 5,732,351 A * | 3/1998 | Olds et al. | ............ | 455/436 |
| 2004/0192221 A1* | 9/2004 | Matsunaga | ............ | 455/76 |
| 2004/0266474 A1* | 12/2004 | Petrus | ............ | 455/525 |
| 2005/0148318 A1* | 7/2005 | Cheng | ............ | 455/405 |
| 2007/0070948 A1* | 3/2007 | Kezys et al. | ............ | 370/331 |
| 2007/0160007 A1* | 7/2007 | Wang et al. | ............ | 370/331 |

OTHER PUBLICATIONS

"A Study of Application-oriented Handover Technology" (w/English abstract), Hideaki Ono et al., The Institute of Electronics, Information and Communication Engineers, vol. 103, No. 692, pp. 279-282, Feb. 27, 2004.
"A Study of Application-oriented Routing and Mobility" (w/English abstract), Junichi Suga et al., The Institute of Electronics, Information and Communication Engineers, vol. 105, No. 87, pp. 51-56, May 19, 2005.

* cited by examiner

*Primary Examiner* — Jayanti K Patel
*Assistant Examiner* — Hooman Houshmand
(74) *Attorney, Agent, or Firm* — Bacon & Thomas, PLLC

(57) ABSTRACT

A method for deciding a handover of a mobile terminal based on context information in a network environment includes receiving context information from the terminal and networks; evaluating selection priorities of network interfaces for each transmission path for each application program based on the context information; and obtaining a handover decision value for selecting a best network interface from among the networks by applying a cost function to the evaluated selection priority. Further, an apparatus for deciding a handover of a mobile terminal based on context information in a network environment, includes a monitor that collects context information from the terminal and networks; an analyzer that evaluates selection priorities of the networks for each transmission path for each application program based on the context information; and a planner that obtains a handover decision value for each transmission path of each application program based on the selection priorities.

13 Claims, 4 Drawing Sheets

US 7,933,248 B2

METHOD AND APPARATUS FOR HANDOVER DECISION BY USING CONTEXT INFORMATION IN A MOBILE COMMUNICATIONS NETWORK

FIELD OF THE INVENTION

The present invention relates to a handover technology in a network; and, more particularly, to a method and apparatus for deciding a handover by using context information in a 4G mobile communications network to provide an optimum handover management.

BACKGROUND OF THE INVENTION

Recently, a variety of researches have been made for a terminal for providing a continuous service during handover. To this end, a media-independent handover has been suggested in IEEE 802.21, so that a standardization activity is being done to perform handover initialization, handover preparation and handover execution independently of media. Especially, there are increasing demands for detecting and selecting a currently available network before a handover is performed. To meet the demands, a lot of researches have been made to develop a handover management scheme in which a handover is decided based on more flexible criteria rather than merely based on signal strength.

In a policy-oriented research, there has been proposed a method of creating an appropriate handover plan through the use of a cost function. Also, a method of modeling a handover using a hypertext transport protocol (HTTP) traffic has been suggested. Moreover, there has been presented a method of deciding a vertical handover depending on a service cost, security, a required power amount, a user's preference, a service quality and a speed. However, such methods do not show in a sufficient detail how such values should be evaluated and applied. Further, researches have been made on a model of performing an intelligent handover directed to a best network interface at a best time. However, most of the researches provide no more than abstract directions, but do not show specified parameters and computing methods.

SUMMARY OF THE INVENTION

In view of the foregoing, the present invention provides a method and a apparatus for a handover decision based on context information in a next-generation mobile communications network so that various services suitable for a user's preferences can be provided by deciding a handover based on not only a signal strength but also various other information collected from a terminal and networks, thereby achieving an efficient mobility management in a 4G network in which heterogeneous networks coexist.

Further, the present invention also provide a method and an apparatus for a handover decision by using context information in a next-generation mobile communications network so that a handover can be decided based on the context information available in a terminal in the next-generation mobile communications network.

In accordance with one aspect of the present invention, there is provided a method for deciding a handover of a mobile terminal based on context information in a network environment, including:

receiving context information from the terminal and networks;

evaluating selection priorities of network interfaces for each transmission path for each application program based on the context information; and obtaining a handover decision value for selecting a best network interface from among the networks by applying a cost function to the evaluated selection priority.

In accordance with another aspect of the present invention, there is provided an apparatus for deciding a handover of a mobile terminal based on context information in a network environment, including:

a monitor that collects context information from the terminal and networks;

an analyzer that evaluates selection priorities of the networks for each transmission path for each application program based on the context information; and a planner that obtains a network handover decision value for each transmission path of each application program based on the selection priorities.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENT

Hereinafter, principles of the present invention will be described in detail with reference to the accompanying drawings, which form a part hereof. In the following description, well-known functions or configurations will not be set forth in detail if it may obscure the invention in unnecessary detail. Further, the following terms are defined in view of functions in the present invention, and may be changed depending on the user's intentions or the usage. Therefore, the terms should be construed by the whole contents of the description.

The present invention decides a handover based on various context information available in a terminal for efficient mobility management in a 4G ($4^{th}$ Generation) network, which is a next-generation mobile communications network adopting various access network technologies. The terminal used in this network is a multimode terminal accessible to a plurality of networks. In this case, a handover matrix is organized on the basis of context information.

The context information is used to execute a handover, and includes the type and properties of the terminal, an amount of resources (of processor, memory, battery, etc.), use cases of the terminal, user's preferences for application programs, an available bandwidth of a network, and a network cost. Further, a single service provided in the terminal may be composed of several application programs. In view of the above, a handover policy may be determined with regard to not only each session of application program but also the whole services.

Figure 1:
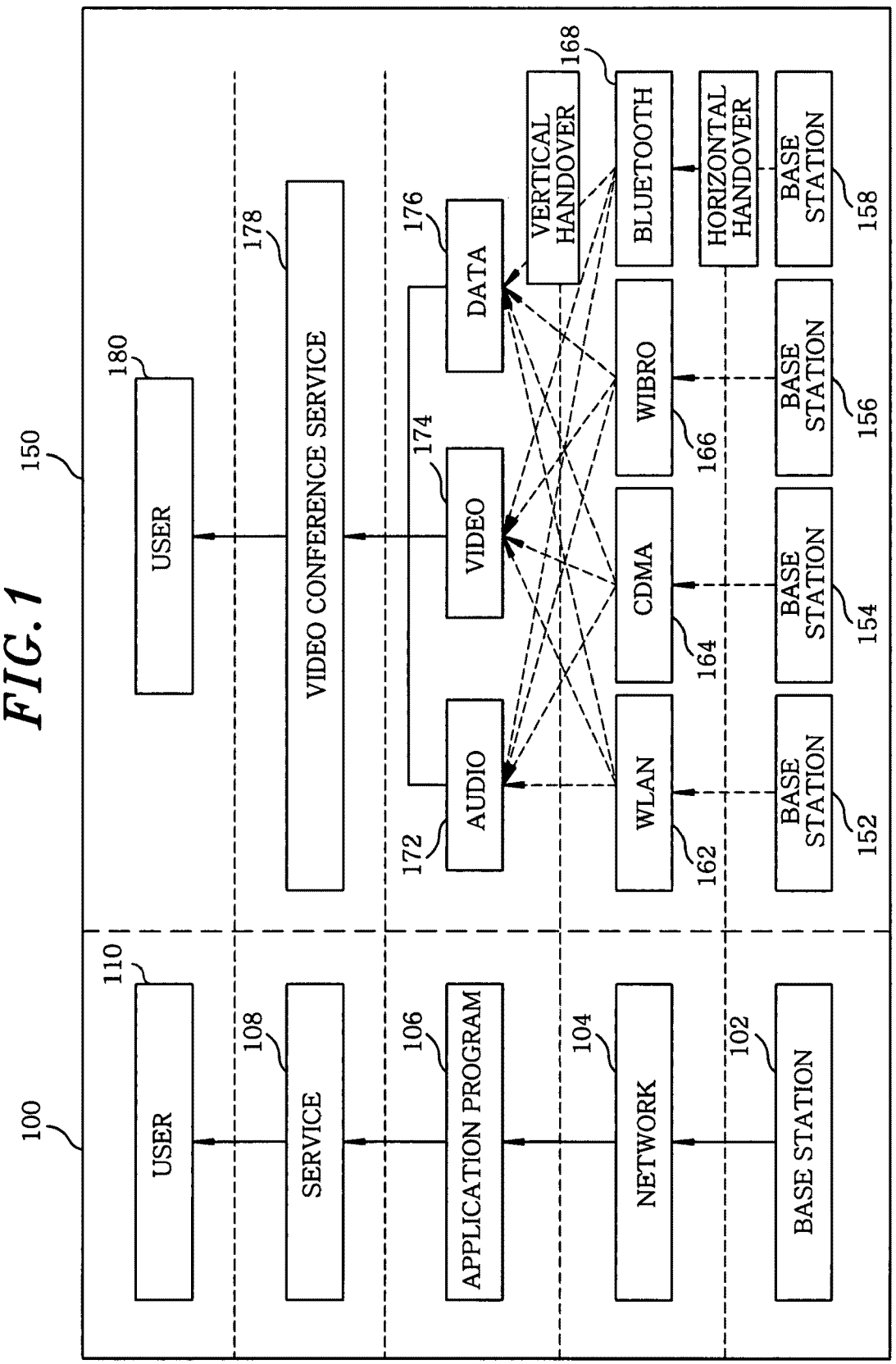
FIG. 1 is a schematic view for describing a handover on the basis of an application service available in a terminal in accordance with an embodiment of the present invention.

FIG. 1 is a schematic view for describing a handover on the basis of an application service available in a terminal in accordance with an embodiment of the present invention.

In FIG. 1, reference numeral 100 denotes a process flow in which a user 110 receives a specific service from a base station 102 in the form of a session, and reference numeral 150 denotes a video conference process presented as an example.

In the process flow 100, the base station 102 executes an application program 106 via a network 104 so that a subscriber terminal can use a mobile communications service, and delivers a service 108 to the terminal for the user 110 to use the service 108. The video conference process 150 is an example of the process flow 100. Base stations 152, 154, 156 and 158 supply various application programs such as audio 172, video 174 and data 176 via networks such as a wireless LAN (WLAN) 162, code division multiple access (CDMA) 164, WiBro 166 and Bluetooth 168 to which the base stations 152, 154, 156 and 158 respectively belong, so that a subscriber terminal can use a mobile communications service. Thus, a video conference service 178 is provided as the service 108 for a user 180 to use.

As described above, a single service used by the user may involve various application programs. In a case where heterogeneous networks coexist, the application programs access different networks and establish sessions corresponding thereto. A process of allowing the application programs to select a specific network is referred to as a vertical handover, and a process of allowing the application programs to select a base station while moving from cell to cell in a specified network is referred to as a horizontal handover.

The present invention is directed to the vertical handover for deciding a network for each application program. In this case, it is decided which network is presently the best for each application program in view of various criteria by considering overall context information. For example, in case of an audio program, when the user wants to receive the best quality service regardless of its cost, the policy is determined such that, e.g., CDMA is to be selected as being presently the best for the audio program.

Figure 2:
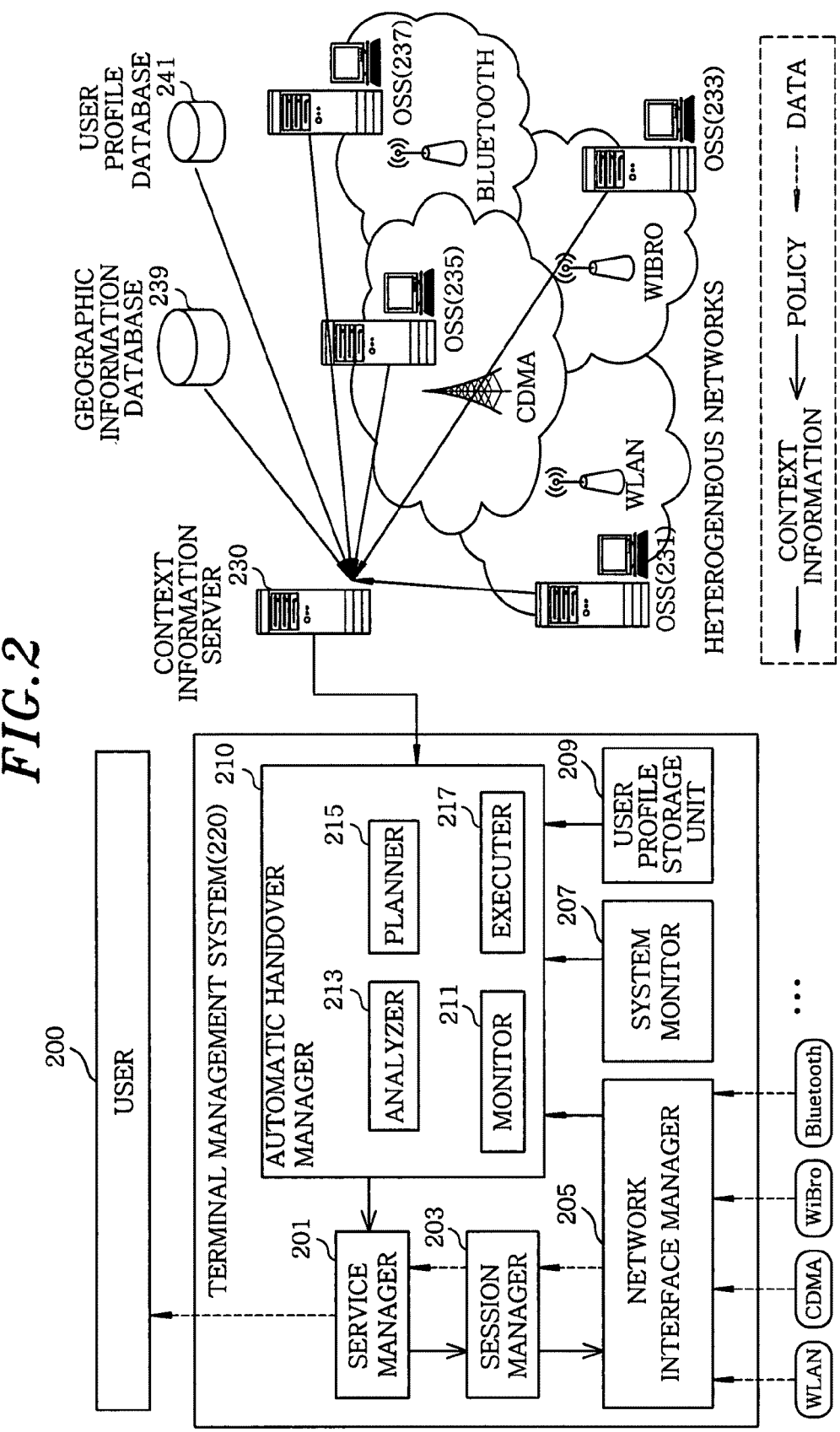
FIG. 2 is a view for illustrating a configuration in which context information is collected by a terminal in accordance with the embodiment of the present invention.

FIG. 2 is a view for illustrating a configuration in which context information is collected by a terminal in accordance with the embodiment of the present invention.

As illustrated therein, a terminal management system 220 in a mobile terminal includes an automatic handover manager (AHM) 210; a network interface manager 205; a system monitor 207; a user profile storage unit 209; a session manager 203; and a service manager 201. The AHM 210 is provided with a monitor 211; an analyzer 213; a planner 215; and an executor 217.

The context information to be used for the handover is provided from the terminal, the user and the network. Specifically, the terminal management system 220 manages the system monitor 207 that collects the context information (remaining battery capacity, available memory capacity, type and properties of the terminal, and the like) from the terminal, the user profile storage unit 209 that stores information of user's profile and preferences, and the network interface manager 205 that manages various network interfaces. Further, the terminal management system 220 evaluates and surveys data from various networks; and lets the session manager 203 receive network context data (bandwidth, reception intensity and the like) from the network interface manager 205.

Operation and Support Systems (OSSs) 231, 233, 235 and 237 that can manage heterogeneous networks are installed in respective network interfaces. The network is also provided with a context information server 230 that collects necessary context information from the OSSs 231, 233, 235 and 237. In addition, the context information server 230 further receives information from a geographic information database 239 that stores a current location of the terminal, and a user profile database 241 that stores user's setting information and user's profile including his/her preferences.

The monitor 211 in the AHM 210 collects the context information sent from the network interface manager 205, the system monitor 207 and the user profile storage unit 209 and the information sent from the context information server 230, and sends the collected information to the analyzer 213. That is, the monitor 211 can collect information received directly by the terminal itself or sent from the context information server 230. Alternatively, the monitor 211 may be configured to collect the collected context information or only pre-selected context information among the collected information.

The analyzer 213 creates a matrix for evaluating various context information sent from the terminal, the user and the network. To be more specific, the analyzer 213 expresses the context information, currently available networks and application programs used for the service in the form of matrix, thereby evaluating selection priorities of the network interfaces for respective transmission paths for the respective application programs. Then, the planner 215 computes a handover decision value for selecting a network for each transmission path for each application program by applying a proper cost function to the matrix to thereby determine the best policy. Thereafter, the executor 217 sends the policy determined by the planner 215 to the relevant module, i.e., the service manager 201 in the terminal management system 220.

The service manager 201, which serves to provide services for the user, manages mappings of services and application programs, and establishes sessions for the application programs as per the policy sent from the AHM 210.

The session manager 203 maintains the sessions established by the service manager 201, selects a network interface to be used, and notifies it to the network interface manager 205. Then, the network interface manager 205 connects the selected network interface by carrying out the handover.

Table 1 given below shows a list of context information collected by the context information server 230 and used for the handover.

TABLE 1

|  | Mobile terminal | Network |
| --- | --- | --- |
| Static | User's settings and profile | User's profile and history |
|  | Application setting | Network location, capabilities and services |
|  | Willingness to pay | Charging models |
|  | Type and properties of the terminal | Support policy for terminal |
| Static in cell | Reachable base station | Potential next base station |
|  | Available networks | Available networks |
| Dynamic | Type of application | Location information and location prediction |
|  | Application requirements | Network status such as signal strength |
|  | Terminal Status (battery, interface status) | Network traffic load |

The context information shown above can be obtained from the terminal and the network. Each context information includes static information and dynamic information. In conventional cases, the handover has been carried out according to the signal strength of the terminal based on the signal-to-noise ratio (SNR). However, in accordance with the present embodiment of the invention, by applying various parameters in addition to the signal intensity, the handover is carried out according to more detailed selections based on more various situations.

The following Formula 1, which is used by the analyzer 213 in the AHM 210, shows the matrix used for determining an optimum policy according to the context information. In Formula 1, it is assumed that there are m number of application programs, n number of network interfaces and k number of available context information.

$$\begin{pmatrix} S_{11} & S_{12} & \ldots & S_{1n} \\ S_{21} & S_{22} & \ldots & S_{2n} \\ \vdots & \vdots & \ddots & \vdots \\ S_{m1} & S_{m2} & \ldots & S_{mn} \end{pmatrix} = \quad \text{(Formula 1)}$$

$$\begin{pmatrix} C_{11} & C_{12} & \ldots & C_{1k} \\ C_{21} & C_{22} & \ldots & C_{2n} \\ \vdots & \vdots & \ddots & \vdots \\ C_{m1} & C_{m2} & \ldots & C_{mk^+} \end{pmatrix} \otimes \begin{pmatrix} R_{11} & R_{12} & \ldots & R_{1n} \\ R_{21} & R_{22} & \ldots & R_{2n} \\ \vdots & \vdots & \ddots & \vdots \\ R_{k1} & R_{k2} & \ldots & R_{kn} \end{pmatrix} \Rightarrow$$

$$(C_{t1} \quad C_{t2} \quad \ldots \quad C_{tk}) \otimes (R_{1j} \quad R_{2f} \quad \ldots \quad R_{kf})^T =$$

$$f(C_{t1}R_{1j}, C_{t2}R_{2j}, \ldots, C_{tk}R_{kf})$$

$$(0 \leq C_{ij} \leq 1. 0 \leq R_{ij} \leq 1)$$

In the above, $S_{ij}$ denotes an expectation of an i-th application program when using a j-th network interface; $C_{ij}$ denotes a weight (equivalent to user's preference) of j-th context information with respect to the i-th application program; and $R_{ij}$ denotes an influence (available bandwidth, signal strength, etc.) of i-th context information in a j-th network.

Figure 3:
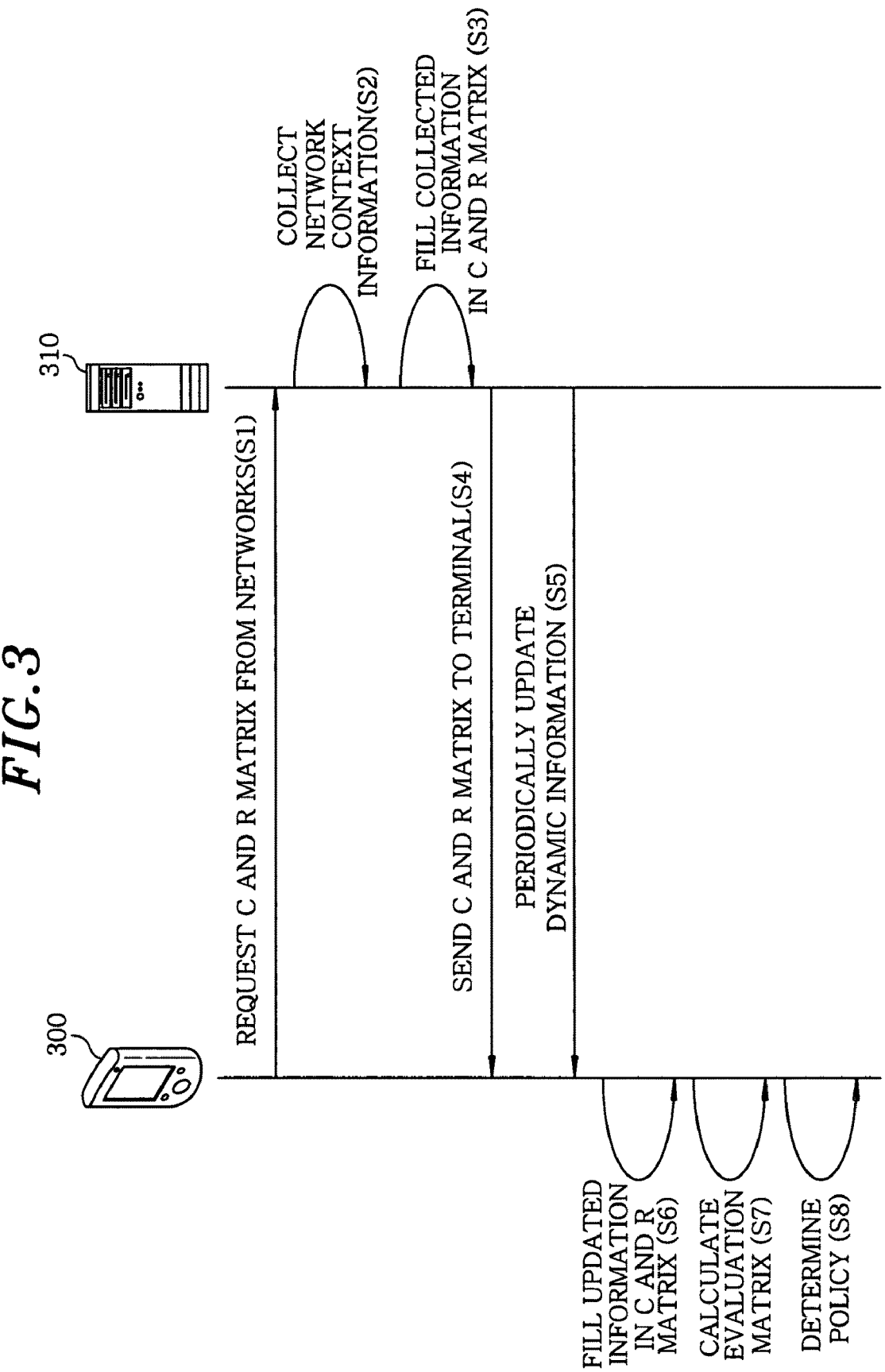
FIG. 3 is a view for illustrating an information exchange procedure between the terminal and a context information server in accordance with the embodiment of the present invention.

FIG. 3 is a view for illustrating an information exchange procedure between the terminal and the context information server in accordance with the embodiment of the present invention.

As shown therein, a mobile terminal 300 requests in step S1 that context information available in a network be filled into, for example, a C and R matrix. Then, a context information server 310 collects the context information from the OSSs 231 to 237 in the networks, the geographic information database 239 and the user profile database 241 (step S2); fills the collected network context information into the C and R matrix (step S3); and, sends information of the C and R matrix to the mobile terminal 300 (step S4). Once C and R values in the matrix are defined, they can be normally reused. However, if the number m of the application programs used for the service of the mobile terminal 300, the number n of the available networks, or the number k of the context information for use in the handover decision are changed, C and R values must be recreated.

After the context information server 310 sends the requested information of the C and R matrix to the mobile terminal 300, the context information server 310 sends only changed context information (e.g., dynamic information such as signal strength and battery capacity) to the mobile terminal 300 in step S5. Upon receipt of such information, the mobile terminal 300 replaces the C and R values received in step S4 with those received in step S6. Then, in step S7, the mobile terminal 300 evaluates the matrix by applying a cost function thereto. Finally, in step S8, the mobile terminal 300 obtains the best policy by the following Formula 2.

Formula 2 is executed by the planner 215 in the AHM 210 shown in FIG. 2, and shows a process of determining a proper policy from the resultant value of Formula 1.

$$\begin{pmatrix} S_{11} & S_{12} & \ldots & S_{1n} \\ S_{21} & S_{22} & \ldots & S_{2n} \\ \vdots & \vdots & \ddots & \vdots \\ S_{m1} & S_{m2} & \ldots & S_{mn} \end{pmatrix} \xrightarrow{policies} \begin{pmatrix} S_{1j} \\ S_{2h} \\ \vdots \\ S_{ml} \end{pmatrix} \equiv \begin{pmatrix} A_1 : N_j \\ A_2 : N_h \\ \vdots \\ A_m : N_l \end{pmatrix} \to Q_k. \quad \text{(Formula 2)}$$

In the above, $S_{ij}$ denotes an expectation of an i-th application program in a j-th network; $A_i$ denotes an i-th application program (e.g., audio, video, or data); $N_j$ denotes a j-th network interface (e.g., WLAN, CDMA, or WiBro); and $Q_k$ denotes a k-th service (e.g., a video conference service). That is, $Q_k$ of the k-th service represents the policy that indicates the best network for each application program of the k-th service. As a result of context processing, we can achieve Q matrix for all of services.

Then, the handover is carried out as per thus determined policy so that the user of the mobile terminal 300 can receive a service suitable for his/her preferences in quality, cost, etc.

In the above, it has been described that the mobile terminal 300 receives the context information from the context information server 310. However, as shown in FIG. 2, if the matrix is computed from the context information transferred from the network interface manager 205, the system collector 207 and the user profile storage unit 209, the terminal may perform this procedure by itself without the context information server 300.

Figure 4:
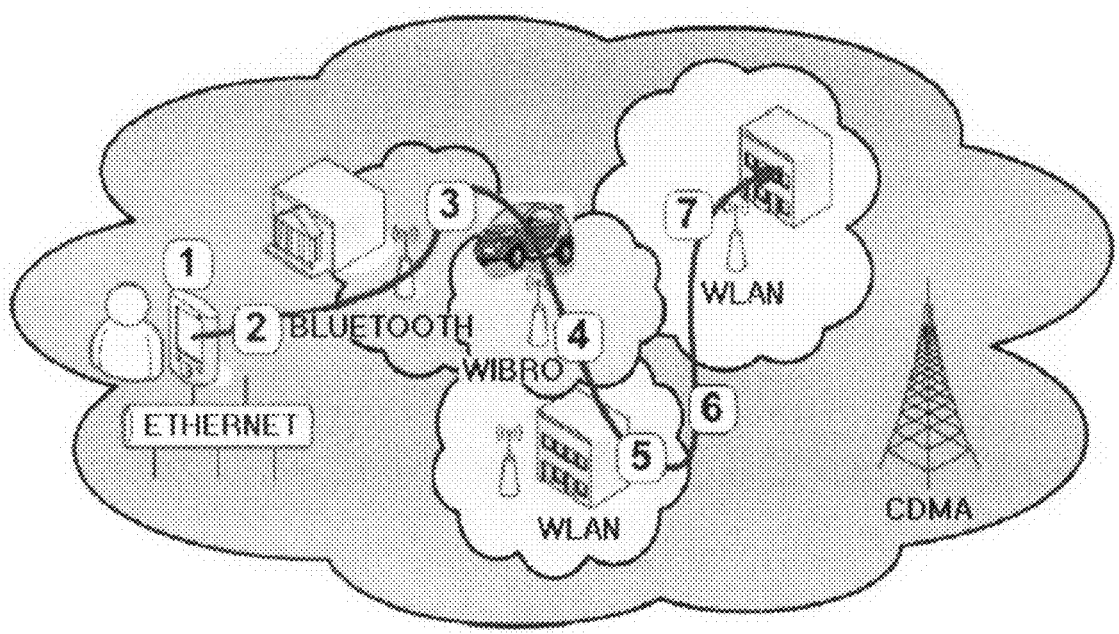
FIG. 4 is a view for illustrating a handover procedure in accordance with the embodiment of the present invention.

FIG. 4 is a view for illustrating a handover procedure in accordance with the embodiment of the present invention.

In FIG. 4, different kinds of networks are assumed to be available for one user, and a network and an application program are to be selected in each situation. Specifically, CDMA and Wired are available in Situation 1; only CDMA is available in Situation 2; CDMA and Bluetooth are available in Situation 3; CDMA, WiBro, WLAN and Bluetooth are available in Situation 4; CDMA and WLAN are available in Situation 5; only CDMA is available in Situation 6; and CDMA and WLAN are available in Situation 7.

In the above, the networks are not selected merely by the signal strength, but the selection is made by the above-described method that considers the cost policy as well as the signal intensity.

Table 2 given below shows schemes for selecting networks for each application program in Situation 1 to 7. Herein, the first row designates each situation; the second row shows all available networks in each situation at a specified location of a terminal, and the third to fifth rows represent respective application programs to be used for a service.

TABLE 2

| | Situation | | | | | | |
|---|---|---|---|---|---|---|---|
| | 1 | 2 | 3 | 4 | 5 | 6 | 7 |
| Available networks | CDMA Wired | CDMA | CDMA Bluetooth | CDMA WiBro WLAN Bluetooth | CDMA WLAN | CDMA | CDMA WLAN |
| Audio | Wired | CDMA | Bluetooth | WiBro | CDMA | CDMA | WLAN |
| Video | Wired | X | Bluetooth | WiBro | WLAN | X | WLAN |
| Data | Wired | CDMA | Bluetooth | WiBro | WLAN | CDMA | WLAN |

As shown above, networks selected for an audio service are same in almost all situations as those selected for a data program, except in Situation 5 where CDMA is used for the audio service and WLAN is used for the data program. Further, in Situation 5, WLAN is used for a video service as in the data program. In Situations 2 and 6, CDMA is the only available network, which implies a resultant value indicating that the handover cannot be carried out.

The following Formula 3 shows a process of obtaining a resultant value, particularly by applying the user's preferences to Situation 5.

$$C: (\text{Audio, Video, Data}) \times (\text{Quality, Cost}), \quad \text{(Formula 3)}$$

$$R: (\text{Quality, Cost}) \times (WLAN, CDMA)$$

$$f(C_{i1}R_{1j}, C_{i2}R_{2j}, \ldots, C_{ik}R_{kj}) = \sum_{m=1}^{k} C_{im}R_{mj}$$

$$\begin{pmatrix} 0.9 & 0.1 \\ 0 & 1.0 \\ 0.1 & 0.9 \end{pmatrix} \otimes \begin{pmatrix} 0.3 & 0.5 \\ 0.7 & 0.3 \end{pmatrix} =$$

$$\begin{pmatrix} 0.34 & 0.48 \\ 0.7 & 0.3 \\ 0.66 & 0.32 \end{pmatrix} \xrightarrow{P} \begin{pmatrix} \text{Audio: } CDMA \\ \text{Video: } WLAN \\ \text{Data: } WLAN \end{pmatrix}$$

The cost function f of quality and cost in Formula 3 is computed by summation, and the largest value is selected from among resultant values of the cost function. The cost function may be applied to different situations in different ways. Herein, each value that ranges from 0 to 1 means preference, i.e., how important each item is evaluated to be. For example, the first row of the C matrix is (0.9, 0.1), which means that, in case of the audio program, the preference in quality is 0.9 and the preference in cost is 0.1. This implies that the user of the video conference service places more emphasis on the quality of the audio than the cost.

Further, if the sum of the cost function has the same value in WLAN and CDMA, the selection may be made depending on other criteria. If, for example, the cost is more important, CDMA will be selected. In contrast, if the priority is assigned to WLAN in case of a tie in preference, WLAN will be selected.

As described above, in accordance with the present embodiment of the invention, the handover can be decided based on various context information available in the terminal for efficient mobility management in the 4G network, which is the next-generation mobile communications network adopting various access network technologies.

Although the present invention has been described with respect to the specific embodiment, it is obvious that various changes and modifications may be made within the scope of the present invention. Therefore, the application programs such as video, audio and data, the network interfaces such as WiBro and Bluetooth, and the services such as the video conference service set forth in the above description of the invention are merely examples, and other application programs, network interfaces and services may be introduced instead thereof.

With regard to the embodiment of the present invention operated as described above, the effects obtained by the features of the invention will be briefly explained below.

In accordance with the present invention, a handover can be decided based on various context information available in a terminal, thereby enabling an efficient mobility management in a 4G network. As a result, an end-user using a terminal can receive services suitable for his/her preferences in quality and cost, thereby making it possible to create a user-oriented service policy. In this manner, the user of the terminal can receive the services in a more favorable manner by the user-oriented services. Further, terminal settings, that have become more complicated due to the development of services and networks, can be made to reflect more various kinds of information, so that the user can use the services in a more flexible manner. Moreover, the present invention can also contribute to supporting the broadband convergence network (BcN) that has been developed due to the progress of various access network technologies.

While the present invention has been described with respect to the embodiments, it will be apparent to those skilled in the art that various changes and modifications may be made without departing from the scope of the invention as defined in the following claims.

What is claimed is:

1. A method for deciding a handover of a mobile terminal based on context information for use in an environment with a plurality of networks, comprising:

collecting context information from the terminal and networks;

evaluating selection priorities of network interfaces for each transmission path for each application program based on the context information; and obtaining a handover decision value for selecting a best network interface from among the networks by applying a cost function to the evaluated selection priority, wherein the selection priorities are evaluated by using the following formula:

$$\begin{pmatrix} S_{11} & S_{12} & \ldots & S_{1n} \\ S_{21} & S_{22} & \ldots & S_{2n} \\ \vdots & \vdots & \ddots & \vdots \\ S_{m1} & S_{m2} & \ldots & S_{mn} \end{pmatrix} =$$

-continued $$\begin{pmatrix} C_{11} & C_{12} & \ldots & C_{1k} \\ C_{21} & C_{22} & \ldots & C_{2n} \\ \vdots & \vdots & \ddots & \vdots \\ C_{m1} & C_{m2} & \ldots & C_{mk^+} \end{pmatrix} \otimes \begin{pmatrix} R_{11} & R_{12} & \ldots & R_{1n} \\ R_{21} & R_{22} & \ldots & R_{2n} \\ \vdots & \vdots & \ddots & \vdots \\ R_{k1} & R_{k2} & \ldots & R_{kn} \end{pmatrix} \Rightarrow$$

$$(C_{t1} \ C_{t2} \ \ldots \ C_{tk}) \otimes (R_{1j} \ R_{2f} \ \ldots \ R_{kf})^T = f(C_{t1}R_{1j}, C_{t2}R_{2j}, \ldots, C_{tk}R_{kf})$$

$$(0 \leq C_{ij} \leq 1.0 \leq R_{ij} \leq 1)$$

wherein Sij denotes an expectation value of an i-th application program when using a j-th network interface; Cij denotes a user's preference of j-th context information with respect to the i-th application program; and Rij denotes an influence of i-th context information in a j-th network.

2. The method of claim 1, further comprising:
requesting a context information server to provide the context information available in the networks;
receiving periodically dynamic context information that has been changed from the context information server; and
updating the received dynamic context information.

3. The method of claim 1, wherein the handover decision value is obtained by using the following formula:

$$\begin{pmatrix} S_{11} & S_{12} & \ldots & S_{1n} \\ S_{21} & S_{22} & \ldots & S_{2n} \\ \vdots & \vdots & \ddots & \vdots \\ S_{m1} & S_{m2} & \ldots & S_{mn} \end{pmatrix} \xrightarrow{policies} \begin{pmatrix} S_{1j} \\ S_{2h} \\ \vdots \\ S_{ml} \end{pmatrix} \equiv \begin{pmatrix} A_1 : N_j \\ A_2 : N_h \\ \vdots \\ A_m : N_l \end{pmatrix} \rightarrow Q_k;$$

wherein Sij denotes an expectation value of an i-th application program in a j-th network; Ai denotes an i-th application program; Nj denotes a j-th network interface; and Qk denotes the handover decision value of a k-th service.

4. The method of claim 1, wherein the context information contains a type and properties of the terminal, an amount of resources, use cases of the terminal, user's preferences for application programs, an available bandwidth of a network, and a network cost.

5. An apparatus for deciding a handover of a mobile terminal based on context information for use in an environment with a plurality of networks, comprising:
a monitor that collects context information from the terminal and networks;
an analyzer that evaluates selection priorities of the networks for each transmission path for each application program based on the context information; and
a planner that obtains a handover decision value for each transmission path of each application program based on the selection priorities,
wherein the analyzer evaluates the selection priorities by using the following formula:

$$\begin{pmatrix} S_{11} & S_{12} & \ldots & S_{1n} \\ S_{21} & S_{22} & \ldots & S_{2n} \\ \vdots & \vdots & \ddots & \vdots \\ S_{m1} & S_{m2} & \ldots & S_{mn} \end{pmatrix} =$$

$$\begin{pmatrix} C_{11} & C_{12} & \ldots & C_{1k} \\ C_{21} & C_{22} & \ldots & C_{2n} \\ \vdots & \vdots & \ddots & \vdots \\ C_{m1} & C_{m2} & \ldots & C_{mk^+} \end{pmatrix} \otimes \begin{pmatrix} R_{11} & R_{12} & \ldots & R_{1n} \\ R_{21} & R_{22} & \ldots & R_{2n} \\ \vdots & \vdots & \ddots & \vdots \\ R_{k1} & R_{k2} & \ldots & R_{kn} \end{pmatrix} \Rightarrow$$

$$(C_{t1} \ C_{t2} \ \ldots \ C_{tk}) \otimes (R_{1j} \ R_{2f} \ \ldots \ R_{kf})^T = f(C_{t1}R_{1j}, C_{t2}R_{2j}, \ldots, C_{tk}R_{kf})$$

$$(0 \leq C_{ij} \leq 1.0 \leq R_{ij} \leq 1)$$

wherein Sij denotes an expectation value of an i-th application program when using a j-th network interface; Cij denotes a user's preference of j-th context information with respect to the i-th application program; and Rij denotes an influence of i-th context information in a j-th network.

6. The apparatus of claim 5, further comprising:
an executor that transfers the handover decision value to a service manager in the terminal.

7. The apparatus of claim 5, wherein the planner obtains the handover decision value by using the following formula:

$$\begin{pmatrix} S_{11} & S_{12} & \ldots & S_{1n} \\ S_{21} & S_{22} & \ldots & S_{2n} \\ \vdots & \vdots & \ddots & \vdots \\ S_{m1} & S_{m2} & \ldots & S_{mn} \end{pmatrix} \xrightarrow{policies} \begin{pmatrix} S_{1j} \\ S_{2h} \\ \vdots \\ S_{ml} \end{pmatrix} \equiv \begin{pmatrix} A_1 : N_j \\ A_2 : N_h \\ \vdots \\ A_m : N_l \end{pmatrix} \rightarrow Q_k;$$

wherein Sij denotes an expectation value of an i-th application program in a j-th network; Ai denotes an i-th application program; Nj denotes a j-th network interface; and Qk denotes the handover decision value of a k-th service.

8. The apparatus of claim 5, wherein the context information is sent from Operation and Support Systems (OSS), a geographic information database and a user profile database.

9. The apparatus of claim 5, further comprising:
a service manager that manages mappings of services and application programs, and establishes sessions for the application programs according to the handover decision value.

10. The apparatus of claim 9, further comprising:
a session manager that maintains the sessions established by the service manager, and selects a best network interface.

11. The apparatus of claim 10, further comprising:
a network interface manager that connects the best network interface by carrying out the handover.

12. The apparatus of claim 11, further comprising:
a system collector that collects information including a remaining battery capacity, an available memory capacity, a type of the terminal and properties of the terminal from the terminal; and
a user profile storage unit that stores information of user's profile and preferences.

13. The apparatus of claim 5, wherein the context contains a type and properties of the terminal, an amount of resources, use cases of the terminal, user's preferences for application programs, an available bandwidth of a network, and a network cost.

* * * * *